United States Patent [19]

Acar

[11] 4,109,675

[45] Aug. 29, 1978

[54] RELIEF VALVE

[75] Inventor: Ali Acar, Los Angeles, Calif.

[73] Assignee: International Telephone and Telegraph Corporation, New York, N.Y.

[21] Appl. No.: 787,955

[22] Filed: Apr. 15, 1977

[51] Int. Cl.² .............................................. F16K 17/04
[52] U.S. Cl. ......................... 137/494; 137/614.18; 251/210
[58] Field of Search ................. 251/77, 210; 137/494, 137/516.27, 614.18, 630.19

[56] References Cited

U.S. PATENT DOCUMENTS 3,321,177  5/1967  Fendel ................................. 251/210

FOREIGN PATENT DOCUMENTS 1,163,658  4/1958  France ................................. 251/77
1,909,972  9/1969  Fed. Rep. of Germany ............. 251/77

Primary Examiner—Robert G. Nilson
Attorney, Agent, or Firm—A. Donald Stolzy

[57] ABSTRACT

A relief or other valve with a soft seal for sealing at high pressures. The seal is independently movable and at least partially pressure balanced for protection against seal damage and deformation. A hard seat is provided for engagement by a hard valve wherein a lost motion connection is provided between the seal and hard valve.

8 Claims, 1 Drawing Figure

U.S. Patent
Aug. 29, 1978
4,109,675
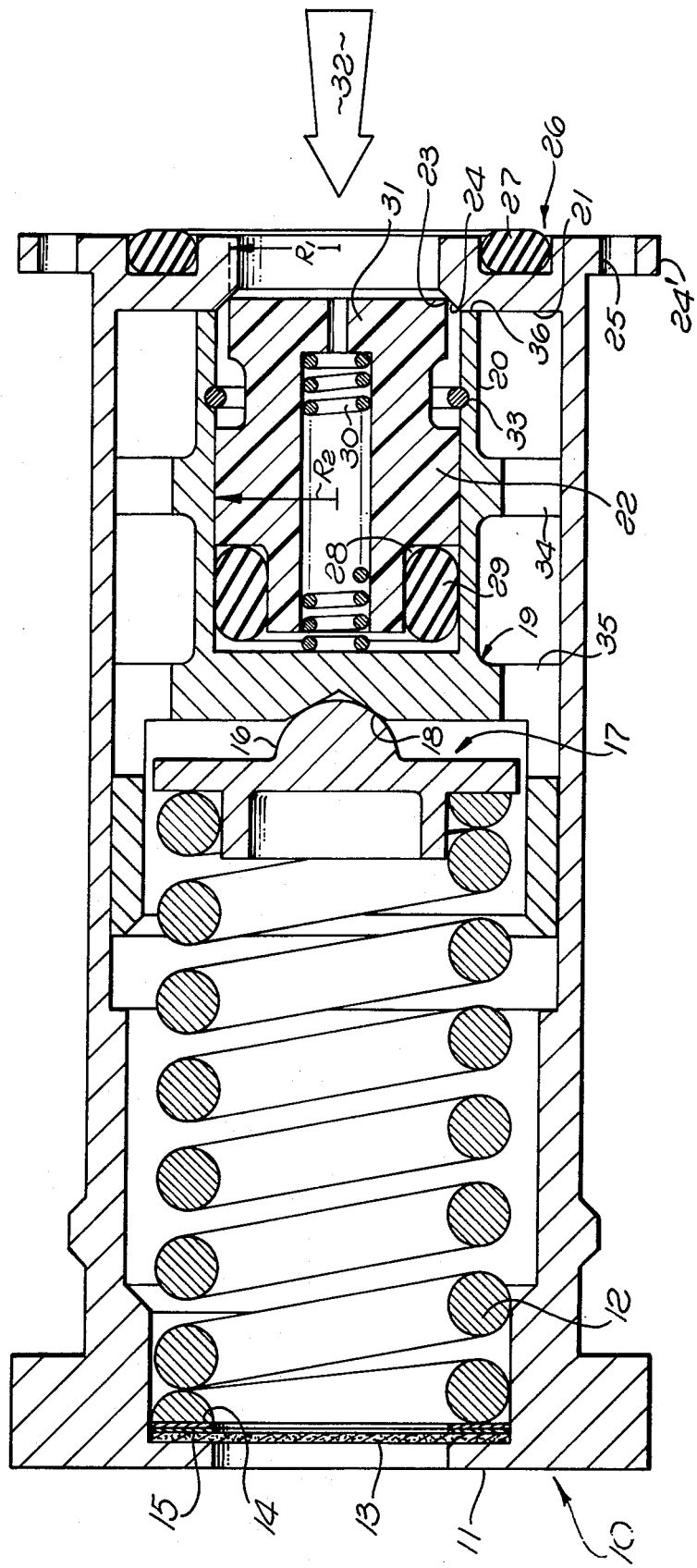

RELIEF VALVE

BACKGROUND OF THE INVENTION

This invention relates to high pressure valves, and more particularly to soft valves made of plastic or the like.

In the past, soft valves have become damaged or deformed.

SUMMARY OF THE INVENTION

In accordance with the present invention, the above-described and other disadvantages of the prior art are overcome by providing a fluid flow control device, said device comprising: a barrel having a cylindrical internal surface; a hollow, cylindrical poppet guided for reciprocation inside said barrel, said barrel having an annular inwardly extending flange at one end thereof, said poppet having a closed end and an open end movable to abut said flange, said poppet being adapted to provide a path for fluid flow from inside thereof between said open end thereof and said flange, and around the exterior thereof but inside said barrel axially toward said closed end, said flange having a hole therethrough to allow fluid under pressure to enter said poppet through said flange hole, said poppet open end being larger than and adapted to close off said flange hole, said flange hole having a beveled interior surface; a cylinder slidable inside said poppet, said cylinder having an annular corner movable into and out of sealing engagement with said surface; an auxiliary spring mounted on said poppet to bias said corner against said surface, said cylinder having an unbalanced force radius at said corner somewhat less than that where said cylinder slides against the interior of said poppet; means to selectively hold said poppet open end in abutment with and spaced from said flange; and a lost motion connection between said poppet and said cylinder.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

The FIGURE is a longitudinal sectional view of a valve constructed in accordance with the present invention.

DESCRIPTION OF THE PREFERRED EMBODIMENT

In FIG. 1, a barrel is shown at 10 having a flange 11. A helically coiled spring is provided at 12 inside barrel 10. A filter 13 is held against flange 11 by spring 12 through shims 14 and 15.

Spring 12 presses a nose portion 16 of a follower 17 against a frustoconical surface 18 of a poppet 19. Poppet 19 has a cylindrical portion 20 which abuts a flange 21 of barrel 10. A cylinder 22 is slidable inside poppet 19. Cylinder 22 has a annular corner 23 which bears against a beveled surface 24 of flange 21.

Barrel 10 has a pair of ears 24' with holes 25 therethrough. Flange 21 has an annular recess 26 in which an O-ring 27 is located. Cylinder 22 has an annular notch 28 in which another O-ring 29 is located. A helically coiled spring 30 is provided which bears against the left interior surface of poppet 19 and against a projection 31 of cylinder 22. This provides a light force to cause corner 23 to seal against beveled surface 24. In addition, when pressure is provided in the direction of arrow 32, the pressure upon cylinder 22 is unbalanced in a direction to cause the unbalanced force thereon to provide a still tighter seal of corner 23 against beveled surface 24.

The embodiment of the invention shown in FIG. 1 is a relief valve. When the pressure in the direction of arrow 32 exceeds a predetermined value, poppet 19 moves to the left, as viewed in FIG. 1, and ring 33 fixed to poppet 19 picks up cylinder 22 slidable therein, and lifts cylinder 22 so that corner 23 no longer engages beveled surface 24. Ring 33 and the surrounding structure thus form a lost motion connection.

In FIG. 1, openings of any sort are provided at 34 and 35 to allow a fluid entering barrel 10 in the direction of arrow 32 inside O-ring 27 to pass between flange 21 and cylinder 22 and flange 21 and poppet 19 through openings 34 and 35, and outwardly through shims 14 and 15, through filter 13 to the exterior of barrel 10.

The fact that the spring 30 is light, the fact that cylinder 22 may be made of nylon or KEL-F or any soft material, makes it possible to obtain a tight seal at corner 23. However, in spite of the fact that a tight seal is so provided, the corner 23 is not damaged or deformed by moving into engagement with beveled surface 24. Still further, the slight unbalance of the forces on cylinder 22 provides a tight seal without causing the seal to be damaged at 23.

Note will be taken that the unbalance is caused because $R_2$ is greater than $R_1$.

In addition to the foregoing, the sealing provided at corner 23 may be provided at high pressures, if desired.

A hard valve and seat are provided in the area of 36 at the end of poppet 19.

What is claimed is:

1. A fluid flow control device, said device comprising: a barrel having a cylindrical internal surface; a hollow, cylindrical poppet guided for reciprocation independent of rotation inside said barrel, said barrel having an annular inwardly extending flange at one end thereof, said poppet having a closed end and an open end movable to abut said flange, said poppet being adapted to provide a path for the fluid flow from inside thereof between said open end thereof and said flange, and around the exterior thereof but inside said barrel axially toward said closed end, said flange having a hole therethrough to allow fluid under pressure to enter said poppet through said flange hole, said poppet open end being larger than and adapted to close off said flange hole, said flange hole having a beveled interior surface; a cylinder slidable inside said poppet, said cylinder having an annular corner movable into and out of sealing engagement with said surface; an auxiliary spring mounted on said poppet to bias said corner against said surface, said cylinder having an unbalanced force radius at said corner somewhat less than that where said cylinder slides against the interior of said poppet; spring means to bias said poppet open end into abutment with said flange; and a lost motion connection between said poppet and said cylinder.

2. The invention as defined in claim 1, wherein said spring means includes a main spring stronger than said auxiliary spring.

3. The invention as defined in claim 2, wherein the space between said poppet and the interior of said barrel is vented through said barrel to the atmosphere.

4. The invention as defined in claim 3, wherein said cylinder is made of a sealing material softer than that of said poppet.

5. The invention as defined in claim 4, wherein a ring seal is compressed between said cylinder and the interior of said poppet.

6. The invention as defined in claim 1, wherein the space between said poppet and the interior of said barrel is vented through said barrel to the atmosphere.

7. The invention as defined in claim 1, wherein said cylinder is made of a sealing material softer than that of said poppet.

8. The invention as defined in claim 1, wherein a ring seal is compressed between said cylinder and the interior of said poppet.

* * * * *